June 25, 1940.  W. BUSCHBECK  2,205,873
METHOD OF MEASURING POWER ON HIGH-FREQUENCY ENERGY LINES
Filed April 30, 1937

INVENTOR
WERNER BUSCHBECK
BY
ATTORNEY

Patented June 25, 1940

2,205,873

UNITED STATES PATENT OFFICE 2,205,873

METHOD OF MEASURING POWER ON HIGH-FREQUENCY ENERGY LINES

Werner Buschbeck, Berlin, Germany, assignor to Telefunken Gesellschaft für Drahtlose Telegraphie m. b. H., Berlin, Germany, a corporation of Germany Application April 30, 1937, Serial No. 139,894
In Germany April 30, 1936

7 Claims. (Cl. 178—44)

This invention relates to a method of measuring the power transmitted on high-frequency transmission lines. In cases of transmitters feeding their power across a long transmission line into the antenna system, the problem is often encountered of controlling continuously the power passing over such line, a problem which hitherto has not as yet been solved in a satisfactory manner. It is also necessary to consider standing waves which appear in case of improper matching.

In accordance with the invention, a method of measuring the high-frequency energy carried on power lines is characterized by the fact that the maximum and the minimum current or the maximum and the minimum voltage is derived from the line and applied to a measuring arrangement at which the product formed of the two values can be read.

In the following, the theoretical principle of the idea of the invention will next be derived. The line equations furnish the known relationship that on a power line $R_{max} \cdot R_{min} = W^2$, whereby R represents the resistance measured at a definite place of the line, and W represents the resistance of the line. Since at the places of oscillation maxima and oscillation minima, the line has a pure ohmic resistance, the energy is represented by:

$$N = J_{min}^2 \cdot R_{min} = J_{max}^2 \cdot R_{max} = \frac{V_{max}^2}{R_{max}} = \frac{V_{min}^2}{R_{min}}$$

wherein I is the current and V the voltage, or:

$$N^2 = J_{max}^2 \cdot R_{max} \cdot J_{min}^2 \cdot R_{min} = J_{max}^2 \cdot J_{min}^2 \cdot W^2:$$

thus $$N = J_{max} \cdot J_{min} \cdot W:$$

or in an analogous manner $$N = \frac{V_{max} \cdot V_{min}}{W}$$

It can be seen from the last two equations which are practically correct since it is permissible to neglect the power losses between the maximum places and minimum places, that the effective power transmitted over the line is directly proportional to the product formed of $I_{max}$ and $I_{min}$, or of $V_{max}$ and $V_{min}$. The special case of ideal matching, namely, the case in which standing waves do not appear and $I_{max}$ is equal to $I_{min}$ is obviously contained in the equations. The transmitted power is then $N = J^2 \cdot W$.

Figure 1:
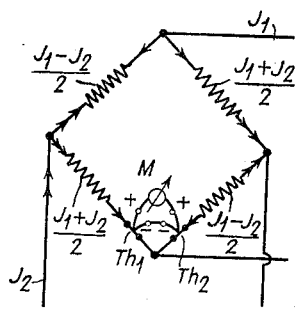
Figure 2:
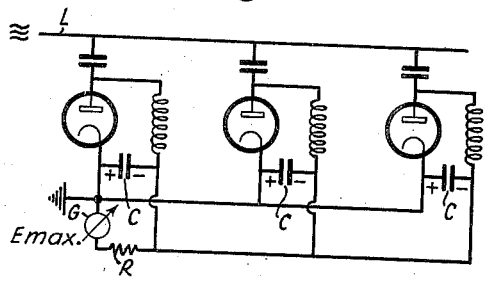
Figure 3:
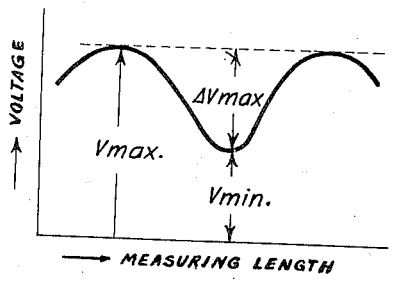
Figure 4:
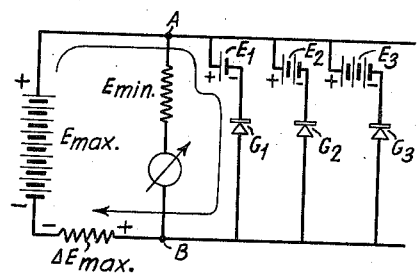
Figure 5:
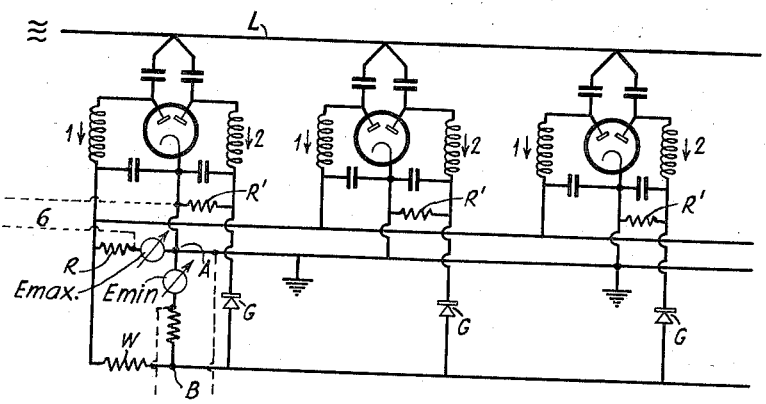
Figure 6:
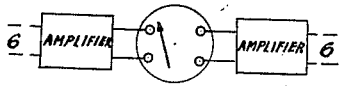

In the accompanying drawing illustrative of certain embodiments of my invention Figure 1 shows a bridge circuit for obtaining an expression of the transmitted power on a high frequency transmission line; Figure 2 shows a rectifier arrangement for obtaining an expression for the voltage maximum in the transmission line; Figure 3 is a graph explanatory of the voltage distribution along the transmission line; Figure 4 shows a rectifier arrangement for obtaining an expression for the voltage minimum in the transmission line, while Figure 5 shows an embodiment of my invention including principles of operation of Figures 2 and 4; Fig. 6 is a schematic illustration of a measuring device for standing waves.

The deducted relations are utilized in accordance with the invention in a line measuring method in that two current converters or rectifiers are displaceably arranged at an energy line (for instance open Lecher wire line, or slotted concentric line) which can be tapped and has a length equal to one half of the maximum wave length to be transmitted, said converters or rectifiers deriving the respective maximum and minimum values of the current or voltage. The maximum values thus rectified are applied to an instrument furnishing a product (electrometer arrangement, dynamometer) thus serving directly for measuring the power. In place of the product forming instruments mentioned as examples, a bridge circuit according to Fig. 1 consisting of resistors may be used. The currents to be multiplied with each other are fed into the two diagonals of the bridge. In two branches of the bridge at the place in which they join each other two thermo-couple elements Th₁ and Th₂ having a purely square log action are inserted such that their direct current paths are connected in opposition. Hence, in the instrument M a current flows which is proportional to the value $$\left(\frac{J_1+J_2}{2}\right)^2 - \left(\frac{J_1-J_2}{2}\right)^2 = J_1 \cdot J_2$$

thus, as desired, the current is proportional to the product formed of the two currents. If, furthermore, the currents of the two bridge branches $$\frac{J_1-J_2}{2} \text{ and } \frac{J_1+J_2}{2}$$

are passed through the windings of a ratio meter (crossed coil instrument with variable air gap), so that a deviation will be obtained which is proportional to the value $$\frac{J_1-J_2}{J_1+J_2}$$

a clear picture of the standing waves appearing on the line is obtained, since $J_1-J_2$ is, in fact, the difference of the maximum value and minimum value, while $J_1+J_2$ is proportional to their arithmetical mean value.

If only the ohmic value of the load resistance varies such as, for instance, owing to fog or frost on antennas, the location of the node is displaced so that the position of the tapping slide need therefore not be varied. The taps may be arranged to move automatically to the positions of the maximum and minimum deviation. To this end, any means serving for the known automatic maximum or minimum tuning could be resorted to, such as for instance the voltage drop at a charging resistor of a resistance-condenser combination having a very large time constant, said voltage drop or the like reversing its direction at charging or discharging.

Where a somewhat more extensive use of taps involves no particular inconvenience, it will not be necessary at all to provide a mechanical displacement of the taps, since purely electrical means are available automatically to indicate the maximum and minimum value of the currents or voltages obtained on a line section.

To this end, the measuring length is equipped with measuring rectifiers placed at short distances. Fig. 2 shows such an arrangement comprising three rectifiers. At the line L carrying high-frequency voltage is derived by capacitive means, and this voltage applied to tube rectifiers. All rectifiers operate across interposed high-frequency chokes upon a common leakage resistor R. If the latter is so high that practically the peak value of the alternating voltages appears as direct voltage at the capacitances C, currents will be supplied only by the rectifier which is situated at the place of the highest voltage, while all other rectifiers remain blocked. The instrument G shows directly the maximum voltage.

The distance between the measuring rectifiers depends solely on the degree of accuracy with which the standing waves which should be measured, since with increasing strength of the standing waves, maximum becomes the more distinct so that therefore the necessity arises of dividing the measuring length into a greater number of sections. As a numerical example, it may be noted that in case of a ratio of the maximum resistance values of 4:1 (corresponding with a very poor matching) there would be obtained at a division of the measuring length into five electrical degrees, a maximum error in the peak measurement of one percent, but at a distribution of the measuring arrangements at a distance of ten electrical degrees, the error will be as great as 5.2%. In case of a resistance ratio of 1:56 a division into ten electrical degrees involves, however, only a maximum error of 1.2%. If the measuring length is to serve for a wider wave range, the distance between the rectifiers will be suitably increased with an increase in the wave length, whereby the optimum arrangement of the rectifier distribution is exponentially proportional to the wavelength.

As compared with the maximum measurement, the measurement of the current or voltage minimum encounters greater difficulties. However, such measurement is also possible by transforming the minimum measurement into a maximum measurement. Fig. 3 shows the voltage distribution (V) at false matching along the measuring length ($l$). In connecting $V_{max}$ and $V_{min}$ in opposition, the length $\Delta V$ is obtained which has a maximum at the place of the voltage minimum.

Now, in order that $\Delta V$ can be measured, in addition to the rectifiers for the voltage maximum measurement, rectifiers for measuring the respective actual voltage are also connected to the high-frequency line. In Fig. 4, the maximum direct voltage $E_{max}$ obtained in the detector arrangement according to Fig. 2, is represented by a battery, and likewise the voltages $E_1$, $E_2$, $E_3$ of the rectifiers which tap the individual voltages. The difference between the maximum voltage and the respective local voltage, i. e. $\Delta E$ then appears at the additionally inserted rectifiers $G_1$, $G_2$, $G_3$ which in this case may be dry contact rectifiers, since it is no longer the high frequency, but a direct voltage which is here under consideration. Also, in this case current is supplied only by the rectifier which lies at the maximum voltage $E_{max}$, namely, in the direction indicated in Fig. 4. Since $E_{max}$ and $\Delta E_{max}$ are placed in opposition as can be seen from the polarity indicated in the figure, the desired voltage $E_{min}$ can be directly obtained between the points A and B. It must only be presupposed that the current flowing through the instrument which indicates the $E_{min}$ be smaller than the total current supplied by $E_{max}$, i. e., current must always be fed from $E_{max}$ into $E_{min}$, since at reversal of the direction of the current, the rectifiers $G_1$ or $G_2$ would be blocked.

Since according to the above representation the counter voltage furnished by $E_{max}$ does not figure in the final measurement, this voltage need not necessarily be furnished by $E_{max}$, but could in principle be any sufficiently high constant voltage.

A final mode of embodiment of the idea of the invention is shown in Fig. 5. From the line L which carries high-frequency two voltages are capacitively derived at each of a plurality of spaced points, and applied to the two anodes of each of the detectors. The rectifier paths 1 operate on the common resistor R at which the voltage $E_{max}$ appears. The other rectifier paths 2 operate individually on their respective resistors R', at which the voltage appears which actually exists at the effective place of measurement. This voltage is applied across rectifiers G (for instance, dry contact rectifiers) to a common resistor W which, as above stated, carries the voltage $\Delta E_{max}$. As in the case of Fig. 4, $E_{min}$ can now be tapped between the points A and B.

Instead of reading $E_{max}$ and $E_{min}$ directly on separate meters the currents indicating these values can be conducted to a dynamometer which indicates the product as a single reading and this can be done either directly or across an amplifier, or as another alternative these currents may be fed into the crossed coils of a ratio meter for measuring the degree of the standing waves as is shown in Fig. 6. If at a given wave length, i. e. with a given antenna and also at a practically fixed position of the node, an accurate setting of the tapping slide is to be avoided, then for the maximum and minimum indication, respectively, a greater number of rectifiers according to the circuits of Figs. 2 and 4 can be used. In this case, a very accurate indication is obtained, even where the nodal position may have slightly changed as, for instance, through slight detuning at a not accurate matching of the antenna.

What is claimed is:

1. The method of measuring power transmitted on a high frequency energy line, said line having voltage maxima and minima uniformly spaced along said line due to standing waves thereon comprising the steps of obtaining values representative of said maximum and minimum voltages and multiplying said values together to obtain a product proportional to the power transmitted.

2. The method of measuring power transmitted along a long transmission line, said transmission line having standing waves thereon which comprises measuring the voltage at spaced points along said line, the spacing of said points being determined by the accuracy desired, determining the maximum and minimum values of said voltages and multiplying said maximum and minimum values to obtain a product proportional to the power transmitted on said line.

3. In a system for measuring the power transmitted on high frequency transmission lines, means for tapping the maximum and the minimum voltages from said line, means for rectifying said voltages and means for obtaining the product of said rectified voltages, said means for tapping the voltages from said line comprising a plurality of rectifiers uniformly distributed along said line and having a common output circuit.

4. In a system for measuring the power transmitted on high frequency transmission lines, means for tapping the maximum and the minimum voltages from said line, means for rectifying said voltages and means for obtaining the product of said rectified voltages, said last mentioned means comprising a resistor bridge circuit having thermo-couple elements inserted in adjoining arms thereof, with their direct current paths connected in opposition, means for applying said rectified voltages to opposite diagonals of said bridge and an indicating instrument connected across the opposed direct current paths of said thermocouple elements.

5. In a system for measuring the power transmitted on a high frequency transmission line having a length at least as long as one-half the length of the wave to be transmitted, a plurality of rectifiers connected at predetermined spaced points along said line the spacing of said points being determined by the accuracy desired, the output circuits of said rectifiers being connected together and having a common load resistor and an indicating instrument connected thereto whereby the voltage maximum on said line may be measured.

6. In a system for measuring the power transmitted on a high frequency transmission line, a plurality of pairs of rectifiers connected at spaced points along said line, the output circuits of one of each of said pairs of rectifiers being connected together and having a common load resistor and an indicating instrument connected thereto whereby the voltage maximum on said line may be measured, an individual load resistor for the other rectifier of each of said pairs, connections for applying the voltage across each individual load resistor to a second common resistor, said connections including a rectifier between each of said individual load resistors and said second common resistor, means connecting one end of each of said common resistors together and an indicating instrument connected between the other end of each of said common resistors whereby the minimum voltage on said line may be measured.

7. In a system for measuring the power transmitted on a high frequency transmission line, a plurality of pairs of rectifiers connected at spaced points along said line, the output circuits of one of each of said rectifiers of said pairs being connected together and having a common load resistor, an individual load resistor for each of the rectifiers of said pairs, connections for applying the voltage across each individual load resistor to a second common resistor, said connections including a rectifier between each of said individual load resistors and said second common resistor, means connecting one end of each of said common resistors together, an indicating instrument having a plurality of actuating elements, one of said elements being connected to said first mentioned common load resistor and the other of said elements connected between the other end of each of said common resistors whereby said indicating instrument indicates the product of the voltage maximum and the voltage minimum on said transmission line.

WERNER BUSCHBECK.